(12) United States Patent
Takahashi et al.

(10) Patent No.: US 9,748,017 B2
(45) Date of Patent: Aug. 29, 2017

(54) ELECTRICALLY CONDUCTIVE RESIN COMPOSITION, AND FILM PRODUCED FROM SAME

(71) Applicant: RIKEN TECHNOS CORPORATION, Tokyo (JP)

(72) Inventors: Tomohiro Takahashi, Tokyo (JP); Hidemasa Sugimoto, Tokyo (JP)

(73) Assignee: RIKEN TECHNOS CORPORATION (JP)

( * ) Notice: Subject to any disclaimer, the term of this patent is extended or adjusted under 35 U.S.C. 154(b) by 44 days.

(21) Appl. No.: 15/021,188

(22) PCT Filed: Aug. 12, 2014

(86) PCT No.: PCT/JP2014/071286
§ 371 (c)(1),
(2) Date: Mar. 10, 2016

(87) PCT Pub. No.: WO2015/037383
PCT Pub. Date: Mar. 19, 2015

(65) Prior Publication Data
US 2016/0225484 A1    Aug. 4, 2016

(30) Foreign Application Priority Data

Sep. 10, 2013    (JP) ................................ 2013-187524

(51) Int. Cl.
*H01B 1/24* (2006.01)
*C09D 5/24* (2006.01)
(Continued)

(52) U.S. Cl.
CPC ................ *H01B 1/24* (2013.01); *C08L 23/04* (2013.01); *C08L 23/16* (2013.01); *C08L 23/286* (2013.01);
(Continued)

(58) Field of Classification Search
CPC .. H01B 1/00; H01B 1/24; C09D 5/24; H01M 4/624; C08J 5/18; C08J 7/04; C08K 3/04
See application file for complete search history.

(56) References Cited

U.S. PATENT DOCUMENTS 9,660,271 B2 *  5/2017  Takahashi ............. H01M 4/624
2008/0099732 A1  5/2008  Nagao et al.
(Continued)

FOREIGN PATENT DOCUMENTS

CN    1366679 A    8/2002
CN    1898753 A    1/2007
(Continued)

OTHER PUBLICATIONS

EP14844477.1 Partial Search Report dated Mar. 15, 2017; 6pgs.
(Continued)

*Primary Examiner* — Mark Kopec
(74) *Attorney, Agent, or Firm* — Bracewell LLP; Brad Y. Chin (57) ABSTRACT

Embodiments of the invention provide an electrically conductive resin composition which enables the formation of a film that has high electrical conductivity and excellent tensile elongation, bending resistance and flexibility, and is suitable for an electrode member for a storage battery. At least one embodiment provides a resin composition including (A) 100 parts by mass of a thermoplastic resin, (B) 1 to 60 parts by mass of carbon nanotubes, and (C) 1 to 60 parts by mass of acetylene black, wherein the thermoplastic resin (A) includes (A1) 30 to 80% by mass of a chlorinated polyethylene having a chlorine content of 20 to 45% by mass and (A2) 70 to 20% by mass of a polyethylene that is different from the component (A1). According to another embodiment, the thermoplastic resin (A) is (A3) a polyethylene that satisfies the following properties (p) and (q): (p) the peak top melting point on the highest temperature side in
(Continued)

a DSC melting curve is 120° C. or higher; and (q) the ratio of melting enthalpy in a temperature range of 110° C. or lower relative to the total melting enthalpy in the DSC melting curve is 50 to 80%.

9 Claims, 1 Drawing Sheet

(51) Int. Cl.
    *C08L 23/04*     (2006.01)
    *C08L 23/28*     (2006.01)
    *H01M 4/60*     (2006.01)
    *H01M 4/66*     (2006.01)
    *C08L 23/16*     (2006.01)
    *H01M 8/18*     (2006.01)
    *H01M 12/08*     (2006.01)

(52) U.S. Cl.
    CPC ........... *H01M 4/604* (2013.01); *H01M 4/668* (2013.01); *H01M 8/188* (2013.01); *H01M 12/085* (2013.01); *Y02E 60/128* (2013.01)

(56) References Cited

U.S. PATENT DOCUMENTS

| | | |
|---|---|---|
| 2009/0011318 A1 | 1/2009 | Sasaki et al. |
| 2010/0163795 A1 | 7/2010 | Kim et al. |
| 2011/0147640 A1 | 6/2011 | Kim et al. |
| 2011/0180762 A1 | 7/2011 | Sasaki et al. |
| 2011/0193030 A1 | 8/2011 | Kolditz et al. |
| 2011/0193031 A1 | 8/2011 | Kolditz et al. |
| 2011/0315934 A1 | 12/2011 | Ma et al. |
| 2013/0037760 A1* | 2/2013 | Maeda ............... H01M 8/0213 252/511 |

FOREIGN PATENT DOCUMENTS

| | | |
|---|---|---|
| CN | 101768367 A | 7/2010 |
| CN | 102124056 A | 7/2011 |
| CN | 102844926 A | 12/2012 |
| EP | 1052654 A1 | 11/2000 |
| EP | 2560228 A1 | 2/2013 |
| EP | 2717352 A1 | 4/2014 |
| EP | 2837661 A1 | 2/2015 |
| JP | 01149370 A | 6/1989 |
| JP | 04259754 A | 9/1992 |
| JP | 0753813 A | 2/1995 |
| JP | 08259767 A | 10/1996 |
| JP | H09262855 A | 10/1997 |
| JP | H1067866 A | 3/1998 |
| JP | 2001015144 A | 1/2001 |
| JP | 2003182763 A | 7/2003 |
| JP | 2005200620 A | 7/2005 |
| JP | 2006111870 A | 4/2006 |
| JP | 2008062497 A | 3/2008 |
| JP | 2009155436 A | 7/2009 |
| JP | 2011228059 A | 11/2011 |
| JP | 2012500317 A | 1/2012 |
| JP | 2012507586 A | 3/2012 |
| JP | 2012507587 A | 3/2012 |
| JP | 2012221775 A | 11/2012 |
| JP | 2013216786 A | 10/2013 |
| TW | 201143191 A1 | 12/2011 |
| TW | 201200553 A1 | 1/2012 |
| WO | 2005056685 A1 | 6/2005 |
| WO | 2006106609 A1 | 10/2006 |
| WO | 2010021437 A1 | 2/2010 |
| WO | 2010038784 A1 | 4/2010 |
| WO | 2011129215 A1 | 10/2011 |
| WO | 2013153969 A1 | 10/2013 |
| WO | 2015037383 A1 | 3/2015 |

OTHER PUBLICATIONS

PCT/JP2014/071286 International Search Report dated Nov. 11, 2014; 15pgs.
EP13776098 Search Report dated Nov. 11, 2015; 7pgs.
PCT/JP2013/059640 International Search Report and Written Opinion dated May 28, 2013; 7pgs.
Takase, "Dispersion Technique and Evaluation of Carbon Nanotubes", Seikei-Kako,vol. 18, No. 9, 2006, pp. 646-652; 9pgs.
PCT/JP2015/075795 International Search Report dated Nov. 17, 2015; 3 pgs.

* cited by examiner

ELECTRICALLY CONDUCTIVE RESIN COMPOSITION, AND FILM PRODUCED FROM SAME

CROSS REFERENCE TO RELATED APPLICATION

This application claims the benefit of and priority to PCT/JP2014/071286 filed on Aug. 12, 2014, entitled (translation), "ELECTRICALLY CONDUCTIVE RESIN COMPOSITION, AND FILM PRODUCED FROM SAME," which claims the benefit of and priority to Japanese Patent Applications No. 2013-187524, each filed on Jul. 10, 2013, all of which are hereby incorporated by reference in their entirety into this application.

BACKGROUND

Field of the Invention

Embodiments of the invention relate to an electrically conductive resin composition and a film thereof. More specifically, embodiments of the invention relate to an electrically conductive resin composition that enables to form a film suitable for an electrode in a storage battery and a protective coating on the electrode, and a film of the electrically conductive resin composition.

Description of the Related Art

Recently, so-called renewable energy, such as solar power, wind power and wave power has received attention as a new energy source alternative to fossil fuel such as petroleum and nuclear energy. However, the output of these renewable energies is extremely unstable due to being highly susceptible to weather or the like. Accordingly, in order to send these energies to a power network in a large amount, it is necessary to level the variation of output by equipping with a large-capacity storage battery, for example.

One example of such large-capacity storage batteries is a redox flow battery. A redox flow battery contains two types of ionic solutions separated by a cation-exchange membrane, and operates with charges/discharges by allowing oxidation reaction and reduction reaction to proceed simultaneously on electrodes provided in the respective solutions. For example, in the case of a redox flow battery using an aqueous solution of vanadium in sulfuric acid for both electrodes, when charged a tetravalent vanadium is oxidized to a pentavalent one on the anode, and a trivalent vanadium is reduced to divalent one on the cathode. When discharged, the reverse reactions occur. A redox flow battery has an advantage of easiness in increasing a facility in size. In addition, a redox flow battery operates at a room temperature and uses no substance having combustibility or explosiveness, and farther does not cause the generation of such a substance. Therefore, a redox flow battery is excellent in safety as compared with a sodium-sulfur battery and a lithium-ion secondary battery.

Electrodes in a redox flow battery are soaked in an electrolytic solution such as an aqueous solution of sulfuric acid and redox reaction occurs thereon. Therefore, the electrodes need a high conductivity and chemical resistance and a carbon fiber aggregate or a platinum plating is used for the electrode. However, a carbon fiber aggregate has liquid permeability, and has a disadvantage that a connection part of a carbon fiber aggregate and a copper wire is eroded by a transported aqueous solution of sulfuric acid or the like. Meanwhile, a platinum plating is a very good conductor and excellent in chemical resistance, but has a disadvantage of being expensive because of being a noble metal.

In view of this, an electrically conductive resin film in which an electrically conductive carbon, such as Ketjen black, is kneaded has been used for a conventional electrode, or an electrode of a carbon fiber aggregate or a copper sheet has been coated with the electrically conductive resin film. However, these electrically conductive resin films have a disadvantage that a large amount of an electrically conductive carbon kneaded therein for the purpose of imparting a sufficiently high conductivity makes the electrically conductive resin film very insufficient in tensile elongation, bending resistance and flexibility and fragile to physical force. Meanwhile, in the case that the amount of an electrically conductive carbon to be formulated is reduced to ensure the tensile elongation, the bending resistance and the flexibility, the volume resistivity becomes over 10 Ω·cm. A redox flow battery using such an electrically conductive film as an electrode or a coating thereon is not satisfactory in that the internal resistance is increased.

On the other hand, recently, a carbon nanotube has received attention as an electrically conductive carbon and expected to solve the above disadvantages. However, it is difficult to defibrate a carbon nanotube, and therefore a carbon nanotube has a disadvantage of being very difficult to be dispersed in a resin. Due to this, in order to obtain a sufficiently high conductivity, a large quantity of carbon nanotubes must be formulated as with Ketjen black. As a result, the large quantity of carbon nanotubes formulated makes the tensile elongation, the bending resistance and the flexibility of the electrically conductive resin film insufficient in practical use. Further, when a higher shear stress is applied in a step of defibrating/dispersing for the purpose of improving the defibrated/dispersed state of a carbon nanotube, the carbon nanotube will be broken. Thus, even if a higher shear stress is applied in a step of defibrating/dispersing, it is still necessary to formulate a large quantity of carbon nanotubes in order to obtain a sufficiently high conductivity.

An electrically conductive film comprised of a composition, which is obtained by mixing a carbon black or a carbon nanotube with a propylene-olefin copolymer wax to make a master batch and mixing this with an organic polymer, also has been proposed in the conventional art. Although this master batch allows a large quantity of a carbon black or a carbon nanotube to be filled, the film to be obtained tends to have an insufficient conductivity.

SUMMARY

Embodiments of the invention provide an electrically conductive resin composition that has a high conductivity and excellent tensile elongation, bending resistance and flexibility and enables to form a film suitable for an electrode member in a storage battery, particularly an electrode in an electrolytic solution-circulating secondary battery, such as a redox flow battery, a zinc-chlorine battery, and a zinc-bromine battery, and a protective coating of the electrode.

Embodiments of the invention further provide a film formed from such an electrically conductive resin composition.

Embodiments of the invention provide a particular thermoplastic resin and a particular electrically conductive carbon in an appropriate amount to address the aforementioned problems identified above.

According to at least one embodiment, there is provided a resin composition including: (A) 100 parts by mass of a thermoplastic resin; (B) 1 to 60 parts by mass of a carbon nanotube; and (C) 1 to 60 parts by mass of an acetylene black, wherein the thermoplastic resin (A) includes: (A1) 30 to 80% by mass of a chlorinated polyethylene having a chlorine content of 20 to 45% by mass; and (A2) 70 to 20% by mass of a polyethylene other than (A1), wherein the sum of (A1) and (A2) is 100% by mass.

According to at least one embodiment, there is provided a resin composition including: (A) 100 parts by mass of a thermoplastic resin; (B) 1 to 60 parts by mass of a carbon nanotube; and (C) 1 to 60 parts by mass of an acetylene black, wherein the thermoplastic resin (A) is (A3) a polyethylene satisfying the following properties (p) and (q): (p) a highest melting point among peak top melting points in a DSC melting curve is 120° C., or higher; and (q) a fraction of melting enthalpy in a temperature range of 110° C. or lower relative to total melting enthalpy in a DSC melting curve is 50 to 80%.

According to at least one embodiment, a highest melting point among peak top melting points in a DSC melting curve of the component (A2) is 110° C. or lower.

According to at least one embodiment, the component (A1) is amorphous.

According to at least one embodiment, there is provided an electrode member for a storage battery, wherein the electrode member includes a resin composition including: (A) 100 parts by mass of a thermoplastic resin; (B) 1 to 60 parts by mass of a carbon nanotube; and (C) 1 to 60 parts by mass of an acetylene black, wherein the thermoplastic resin (A) includes: (A1) 30 to 80% by mass of a chlorinated polyethylene having a chlorine content of 20 to 45% by mass; and (A2) 70 to 20% by mass of a polyethylene other than (A1), wherein the sum of (A1) and (A2) 100% by mass.

According to at least one embodiment, there is provided a film including a resin composition including: (A) 100 parts by mass of a thermoplastic resin; (B) 1 to 60 parts by mass of a carbon nanotube; and (C) 1 to 60 parts by mass of an acetylene black, wherein the thermoplastic resin (A) includes: (A1) 30 to 80% by mass of a chlorinated polyethylene having a chlorine content of 20 to 45% by mass; and (A2) 70 to 20% by mass of a polyethylene other than (A1), wherein the sum of (A1) and (A2) is 100% by mass.

According to at least one embodiment, there is provided an electrode member for a storage battery, wherein the electrode member includes a film including a resin composition including: (A) 100 parts by mass of a thermoplastic resin; (B) 1 to 60 parts by mass of a carbon nanotube; and (C) 1 to 60 parts by mass of an acetylene black, wherein the thermoplastic resin (A) includes: (A1) 30 to 80% by mass of a chlorinated polyethylene having a chlorine content of 20 to 45% by mass; and (A2) 70 to 20% by mass of a polyethylene other than (A1), wherein the sum of (A1) and (A2) is 100% by mass.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

DETAILED DESCRIPTION

Although the following detailed description contains many specific details for purposes of illustration, it is understood that one of ordinary skill in the relevant art will appreciate that many examples, variations, and alterations to the following details are within the scope and spirit of the invention. Accordingly, the exemplary embodiments of the invention described herein are set forth without any loss of generality, and without imposing limitations, relating to the claimed invention. Like numbers refer to like elements throughout. Prime notation, if used, indicates similar elements in alternative embodiments.

The components constituting the resin composition according to various embodiments of the invention will be described.

(A) Thermoplastic Resin

According to at least one embodiment, the thermoplastic resin as the component (A) accepts the component (B) as a carbon filler, and ensures film formability and serves to impart mechanical properties such as tensile elongation, bending resistance and flexibility to a film to be obtained.

According to at least one embodiment, the thermoplastic resin as the component (A) is a thermoplastic resin mixture comprised of (A1) 30 to 80% by mass of a chlorinated polyethylene having a chlorine content of 20 to 45% by mass and (A2) 70 to 20% by mass of a polyethylene other than (A1). Here, the sum of (A1) and (A2) is 100% by mass. By using the above thermoplastic resin mixture as the component (A), a film of a resin composition can be obtained which has extremely good electrolytic solution resistance, particularly resistance to an aqueous solution of vanadium sulfate. The contents of the component (A1) and the component (A2) are 50 to 65% by mass and 50 to 35% by mass, respectively.

(A1) Chlorinated Polyethylene

According to at least one embodiment, the chlorinated polyethylene having a chlorine content of 20 to 45% by mass as the component (A1) plays an important role to ensure the resistance to an aqueous solution of vanadium sulfate of a film to be obtained. On the other hand, due to the chlorine contained therein, care should be taken so as not to cause a trouble such as bunting during processing. Therefore, the chlorine content needs to be 20 to 45% by mass. A chlorine content of 45% by mass or less enables to suppress the possibility of the occurrence of a trouble such as burning during processing. A chlorine content of 20% by mass or more enables to achieve the objective of formulating the chlorinated polyethylene to ensure the resistance to an aqueous solution of vanadium sulfate. The chlorine content is preferably 25 to 40% by mass.

According to at least one embodiment, a polyethylene to be chlorinated is not particularly limited, and examples thereof include a low-density polyethylene, a linear low-density polyethylene, an ultra-low-density polyethylene, a high-density polyethylene, an ethylene homopolymer, a copolymer of ethylene and an α-olefin (e.g., one or two or more of 1-butene, 1-hexene, 1-octene and the like) and any mixture thereof. The chlorination may be performed by using any know method as long as a chlorine content in the above range can be obtained. Typically, an aqueous suspending method can be employed.

According to at least one embodiment, the component (A1) is preferably amorphous from the viewpoint of reducing a shear stress during processing to prevent a trouble such as burning and dispersing the components (B) and (C) well to make the initial conductivity good.

It is to be noted herein that an amorphous chlorinated polyethylene is defined as one which has no clear melting peak or one which has a melting peak at which the amount of heat of melting (ΔH) is less than 10 J/g in a second melting curve (i.e., a melting curve determined during the last temperature elevation process) determined by using, for example, a Diamond DSC-type differential scanning calorimeter from PerkinElmer Japan Co., Ltd., with a program to retain at 190° C. for 5 minutes, cool to −10° C. at 10° C./min, retain at −10° C. for 5 minutes and raise the temperature to 190° C. at 10° C./min.

In addition, the component (A1) is preferably one having a high fluidity from the viewpoint of reducing a shear stress during processing to prevent a trouble such as burning and dispersing the components (B) and (C) well to make the initial conductivity good. The melt flow rate of the component (A1) (hereinafter, sometimes abbreviated as MFR-A1) measured in accordance with JIS K7210:1999 under conditions of 180° C. and 211.8 N is preferably 10 g/10 min or more, and more preferably 50 g/10 min or more. On the other hand, MER-A1 of the component (A1) is preferably 500 g/10 min or less from the viewpoint of achieving a fluidity to ensure a sufficient acceptability for the component (B).

Examples of such a chlorinated polyethylene commercially available include, for example, "ELASLEN 303A" (trade name) and "ELASLEN 302NA" (trade name) from Showa Denko K.K.

(A2) Polyethylene Different from the Above (A1)

According to at least one embodiment, the polyethylene as the component (A2) is not particularly limited as long as being a polyethylene different from (A1). Typically, the polyethylene as the component (A2) is not chlorinated. For the polyethylene as the component (A2), one of a low-density polyethylene, a linear low-density polyethylene, an ultra-low-density polyethylene, a high-density polyethylene, an ethylene homopolymer, a copolymer of ethylene and an α-olefin (e.g., one or two or more of 1-butene, 1-hexene, 1-octene and the like) be used singly, or a mixture in which two or more of them are arbitrarily formulated can be used. In the case where a mixture is used, the mixture preferably satisfies the following Tm-A2 range or the following MFR-A2 range as a whole.

According to at least one embodiment, the component (A2) plays an important role to ensure film formability. Therefore, the component (A2) is preferably excellent in filler loading property, and the highest melting point among peak top melting points in the DSC melting curve of the component (A2) (hereinafter, sometimes abbreviated as Tm-A2) is preferably 110° C. or lower. This Tm-A2 is more preferably 105° C. or lower. Meanwhile, Tm-A2 is preferably 60° C. or higher from the viewpoint of suppressing the swelling of the component (A2) due to an electrolytic solution.

It is to be noted herein that the highest melting point among peak top melting points in a DSC melting curve means the highest melting point among peak top melting points in a second melting curve (i.e., a melting curve determined during the last temperature elevation process) determined by using, for example, a Diamond DSC-type differential scanning calorimeter from PerkinElmer Japan Co., Ltd., with a program to retain at 190° C. for 5 minutes, cool to −10° C. at 10° C./min, retain at −10° C. for 5 minutes and raise the temperature to 190° C. at 10° C./min.

In addition, according to at least one embodiment, the component (A2) is preferably one having a high fluidity from the viewpoint of reducing a shear stress during processing to prevent a trouble such as burning. The melt flow rate of the component (A2) (hereinafter, sometimes abbreviated as MFR-A2) measured in accordance with JIS K7210:1999 under conditions of 190° C. and 21.18 N is preferably 1 g/10 min or more, and more preferably 5 g/10 min or more. On the other hand, MFR-A2 of the component (A2) is preferably 100 g/10 min or less from the viewpoint of achieving a fluidity allowing to ensure a sufficient acceptability for the component (B).

(A3) Polyethylene Satisfying Properties (p) and (q)

In accordance with another embodiment of the invention, there is provided a thermoplastic resin as the component (A) is (A3) a polyethylene satisfying the following properties (p) and (q): (p) the highest melting point among peak top melting points in a DSC melting curve is 120° C. or higher; and (q) the fraction of melting enthalpy in a temperature range of 110° C. or lower relative to the total melting enthalpy in a DSC melting curve is 50 to 80%.

According to at least one embodiment, a resin composition obtained by using the component (A3) as the component (A) is particularly excellent in film formability, and a film formed from the resin composition is particularly excellent in bending resistance and heat resistance.

Property (p)

According to at least one embodiment, this property (p) is an indicator of the heat resistance of a polyethylene, and determined by using the above method. In the case where the highest melting point among peak top melting points in the DSC melting curve of the component (A3) (hereinafter, sometimes abbreviated as Tm-A3) is 120° C. or higher, that is, the component (A3) satisfies the property (p), a film excellent in bending resistance and heat resistance can be obtained. Higher Tm-A3 is preferred. Tm-A3 is preferably 125° C. or higher, and more preferably 130° C. or higher. Although the upper limit of Tm-A3 is not particularly specified, it is around 135° C. at the highest as being a polyethylene.

Property (q)

Figure 1:
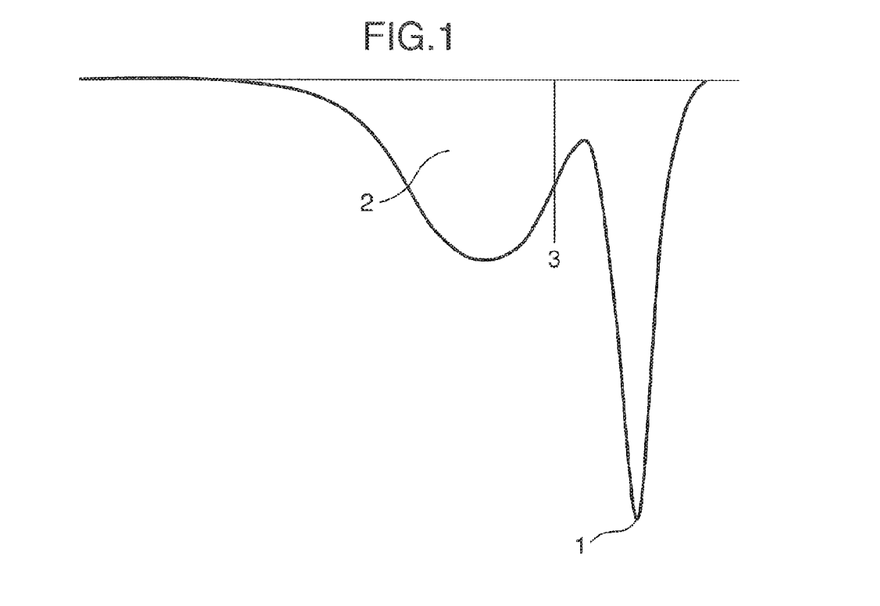
FIG. 1 is a conceptual drawing of a DSC melting curve according to an embodiment of the invention.

According to at least one embodiment, this property (q) is an indicator of the filler loading property of a polyethylene, which is the fraction of melting enthalpy in a temperature range of 110° C. or lower relative to the total melting enthalpy in a DSC second melting curve determined by using the above method. In FIG. 1, the signs 1, 2 and 3 indicate the highest melting point among peak top melting points in a DSC second melting curve, an integration of melting enthalpy in a temperature range of 110° C. or lower in the DSC second melting curve, and a boundary line at a temperature of 110° C. in the DSC second melting curve, respectively. In the case where the fraction of melting enthalpy in a temperature range of 110° C. or lower relative to the total melting enthalpy (hereinafter, sometimes abbreviated as Xc) in the DSC melting curve of the component (A3) is 50% or more, a resin composition having an excellent processability can be obtained. Further, a film formed from such a resin composition has a good electrolytic solution resistance. The Xc of the component (A3) is preferably 60% or more. On the other hand, Xc of the component (A3) is 80% or less, and more preferably 70% or less from the viewpoint of the bending resistance and the heat resistance of a film to be formed.

According to at least one embodiment, the above component (A3) is not particularly limited as long as being a polyethylene satisfying the above properties (p) and (q).

Examples thereof include a low-density polyethylene, a linear low-density polyethylene, an ultra-low-density polyethylene, a high-density polyethylene, an ethylene homopolymer, a copolymer of ethylene and an α-olefin (e.g., one or two or more of 1-butene, 1-hexene, 1-octene and the like). For the component (A3), one of these can be used singly, or a mixture in which two or more of them are arbitrarily formulated can be used. In the case where a mixture is used, the mixture may only satisfy the above properties (p) and (q) as a whole.

(B) Carbon Nanotube

According to at least one embodiment, a carbon nanotube as the component (B) is a fibrous substance having a diameter of around 1 to 250 nm and a length of around 0.1 to 250 μm which is a single- or multi-layered coaxial tube six-membered ring network made from carbon atoms (graphene sheet). The carbon nanotube as the component (B) serves as an electrically conductive filler to impart a high conductivity to a resin composition and a film thereof. Accordingly, the carbon nanotube as the component (B) is preferably one having less lattice defects and a high conductivity. In addition, one having a small bulk specific gravity is preferred because it is easily defibrated.

Examples of commercially available products of such a carbon nanotube include, for example, "Nanocyl NC7000" (trade name) from Nanocyl SA and "VGGF-X" (trade name) from Showa Denko K.K.

According to at least one embodiment, the amount of the component (B) to be formulated is 1 part by mass or more, preferably 10 parts by mass or more, and more preferably 20 parts by mass or more based on 100 parts by mass of the above component (A) from the viewpoint of conductivity. Meanwhile, from the viewpoint of tensile elongation and bending resistance, the amount of the component (B) to be formulated is 60 parts by mass or less, preferably 50 parts by mass or less, and more preferably 45 parts by mass or less.

(C) Acetylene Black

According to at least one embodiment, an acetylene black as the component (C), which is carbon fine particles produced by pyrolysis of an acetylene gas, is an electrically conductive carbon black having a structure a part of which is graphitized. The acetylene black as the component (C) can keep the workability in a step of producing (or melt-kneading) a resin composition and a step of film-forming to assist the component (B) to be defibrated/highly dispersed, which results in the increase of the electrical conductivity of the film and the improvement in the mechanical properties such as tensile elongation and bending resistance. In addition, since the acetylene black as the component (C) has conductivity in itself, it serves to increase the conductivity of a resin composition and a film thereof.

Examples of commercially available products of acetylene black include, for example, "DENKA BLACK" (trade name) from Denki Kagaku Kogyo K.K.

According to at least one embodiment, the amount of the component (C) to be formulated is 1 part by mass or more, preferably 6 parts by mass or more, and more preferably 10 parts by mass or more based on 100 parts by mass of the above component (A) from the viewpoint of the tensile elongation and the bending resistance of a film to be obtained. Meanwhile, from the viewpoint of the electrolytic solution resistance, the tensile elongation and the bending resistance of a film to be obtained, the amount of the component (C) to be formulated is 60 parts by mass or less, preferably 40 parts by mass or less, and more preferably 30 parts by mass or less.

According to at least one embodiment, as an electrically conductive carbon black other than an acetylene black is known Ketjen black. Ketjen black has a high conductivity, but has a hollow shell-like structure in contrast to an acetylene black, due to which a resin composition obtained by kneading an electrically conductive filler primarily containing Ketjen black with the above components (A) and (B) does not exhibit melt ductility in film-forming, which complicates film-forming.

According to at least one embodiment, the resin composition according to various embodiments of the invention farther contains a known additive, for example, an additive such as a lubricant, an antioxidant, an antiaging agent, a weatherability stabilizer such as a photostabilizer and a ultraviolet absorber, a thermal stabilizer, a copper inhibitor, a release agent and a surfactant as long as it does not impair the object of the present invention. The amount of such an additive to be formulated may be around 0.001 to 5 parts by mass based on 100 parts by mass of the component (A).

In addition, an inorganic filler other than the components (B) and (C) can be further contained in the resin composition as long as it does not impair the object of the present invention. Examples of such an inorganic filler include precipitated calcium carbonate, ground calcium carbonate, hydrated magnesium silicate and talc. The amount of the inorganic filler to be formulated may be around 1 to 20 parts by mass based on 100 parts by mass of the component (A).

According to at least one embodiment, the resin composition can be obtained by melt-kneading the above components (A) to (C) and an optional component(s) used as desired using any melt-kneader. Examples of the melt-kneader include a hatch-type kneader such as a pressurizing kneader and a mixer; an extrusion kneader such as a co-rotational twin-screw extruder and a counter-rotational twin-screw extruder; and a calender roll kneader. These may be used in any combination.

According to at least one embodiment, the obtained resin composition may be pelletized by using any method, and thereafter may be formed into a film by using a calender processor or by using an extruder and a T-die. The pelletization can be performed by using a method such as a hot cut method, a strand cut method and an underwater cut method. Alternatively, the resin composition after being melt-kneaded may be directly sent to a calender processor or a T-die to form a film. Any calender processor can be used, and examples thereof include an upright three-roll type, an upright four-roll-type, an L-shaped four-roll type, and inverted L-shaped four-roll type and a Z-shaped roll type. Any extruder can be used, and examples thereof include a single-screw extruder, a co-rotational twin-screw extruder and a counter-rotational twin-screw extruder. Any T-die can be used, and examples thereof include a manifold die, a fishtail die and a coat hanger die.

Although the thickness of the thus-obtained film is not particularly limited, for example, in the case where the film is used for an electrode member in a redox flow battery (storage battery) using an aqueous solution of vanadium in sulfuric acid for both electrodes, the thickness may be 100 to 1000 μm. Further, the film may be cross-linked/cured by using a known method such as electron beam irradiation in order to enhance the heat resistance and the electrolytic solution resistance.

EXAMPLES

Embodiments of the invention will be described below with Examples, but the embodiments of the invention are not limited thereto.

Method for Measuring/Evaluating Physical Properties (i) Initial Conductivity (Ω1)

Figure 2:
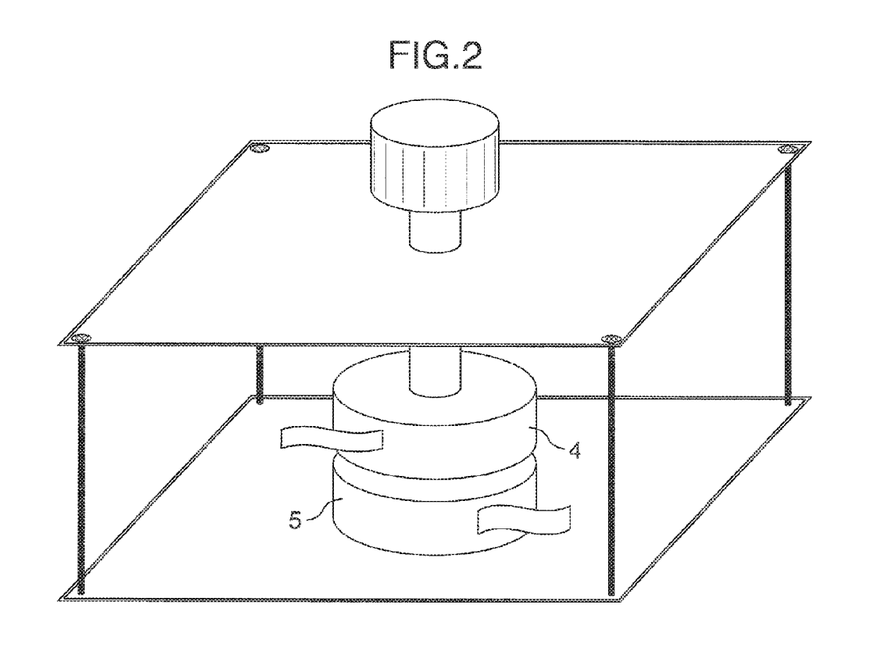
FIG. 2 is a device to measure initial conductivity according to an embodiments of the invention.

A device, as shown in FIG. 2) was used having an electrode 4 and another electrode 5 each of which had a cylindrical shape with a diameter of 36 mm and a height of 10 mm and made of brass (material number C2600 defined in JIS) and a screw to press the electrode 4 and the electrode 5. A film was sandwiched between the electrode 4 and the electrode 5 in the device, to which a resistivity meter "AC Milliohm Hi-Tester 3560" (trade name) from HIOKI E.E. Corporation was connected. Next, the screw was further tighten to a tightening torque of 0.3 N·m, and a resistance value 5 minutes after a given torque was reached was measured as the initial conductivity (unit: mΩ).

(ii) Electrolytic Solution Resistance

A small piece of film obtained by cutting a film into a size of 40 mm (in the machine direction of the film)×40 mm (in the width direction of the film) was soaked in an aqueous solution (concentration: 2.0 mole/liter) of vanadium sulfate (the oxidation number of the vanadium: 5) at a normal temperature (temperature: 23±2° C.) for 7 days followed by washing with water. Thereafter, the surface of the film was visually observed and the electrolytic solution resistance was evaluated by using the following criteria.

⊚: No change was observed on the surface of the film.

○: A mottled pattern was observed on the surface of the film.

Δ: A rainbow-colored mottled pattern like an oil film was generated in part of the surface of the film.

×: A rainbow-colored mottled pattern like an oil film was generated in the whole surface of the film.

(iii) Volume Resistivity ρ

The volume resistivity of a film was measured by using a four-point probe array method (a probe method) in accordance with JIS K7194:1994. A film the state of which had been regulated in a testing room having a temperature of 23=2° C. and a relative humidity of 50±5% for 24 hours or longer was cut into a size of 80 mm (in the machine direction of the film)×50 mm (in the width direction of the film) to prepare a test piece. The volume resistivity value was measured for 5 measurement positions per test piece by using a resistivity meter "Loresta GP MCP-T610" (trade name) from Mitsubishi Chemical Analytech Co., Ltd. with probes aligned at equal intervals (interval between probes: 5 mm). This measurement was performed for three test pieces, and the average value of the total 15 volume resistivity values was defined as the volume resistivity ρ of the film. The thickness of the film was measured in accordance with a method for measuring the dimension of a test piece defined in JIS K7194 by using a dial thickness gage "H-1A" (trade name) from OZAKI MFG. CO., LTD. For methods for measuring electric resistivity and a theory thereon, the website of Mitsubishi Chemical Analytech. Co., Ltd. (http://www.mccat.co.jp/3seihin/genri/ghlup2.htm) can be referred to.

(iv) Bending Resistance

A test piece of the type 1B test piece defined in HS K7127 was stamped out from a film the state of which had been regulated in a testing room having a temperature of 23±2° C. and a relative humidity of 50±5% for 24 hours or longer so that the machine direction of the film corresponded to the tensile direction, and the test piece was bent by 180 so that the chucked portions in both ends of the test piece totally met. After running the fingers with the bent portion held therebetween, the film was raised. Subsequently, the film was similarly bent by 180° to the opposite direction, and after running the fingers with the bent portion held therebetween, the film was bent back. This one set operation in which bending and bending back are performed in one direction and thereafter bending and bending back are performed at the same bent portion in the opposite direction was repeated to evaluate the bending resistance by using the following criteria.

⊚: The film was not broken even after the 10th set.

○: The film was broken after the initiation of the 6th set and before or on the completion of the 10th set.

Δ: The film was broken after the initiation of the 2nd set and before or on the completion of the 5th set.

×: The film was broken before or on the completion of the 1st set.

(v) Bending Resistance After Heat-Moisture Treatment

A test piece of the type 1B test piece defined in JIS K7127 was stamped out from a film which had been exposure-treated in a thermo-hygrostat chamber having a temperature of 60±2° C. and a relative humidity of 98% for 7 days so that the machine direction of the film corresponded to the tensile direction, and the test piece was bent by 180° so that the chucked portions in both ends of the test piece totally met. After running the fingers with the bent portion held therebetween, the film was bent back. Subsequently, the film was similarly bent by 180° to the opposite direction, and after running the fingers with the bent portion held therebetween, the film was bent back. This one set operation in which bending and bending back are performed in one direction and thereafter bending and bending back are performed at the same bent portion in the opposite direction was repeated to evaluate by using the following criteria.

⊚: The film was not broken even after the 10th set.

○: The film was broken after the initiation of the 6th set and before or on the completion of the 10th set.

Δ: The film was broken after the initiation of the 2nd set and before or on the completion of the 5th set.

×: The film was broken before or on the completion of the 1st set.

(vi) Tensile Elongation

The tensile elongation of a film was measured in accordance with JIS K7127:1999. Regarding the width direction of the film as the tensile direction, a tensile test was performed for a film the state of which had been regulated in a testing room having a temperature of 23±2° C. and a relative humidity of 50±5% for 24 hours or longer to determine the value of the elongation at break by using a tensile tester "AUTOGRAPH AGS-1kNG" (trade name) from Shimadzu Corporation under the following conditions: a type 1 test piece (dumbbell); an initial distance between chucks: 120 mm; a distance between bench mark lines: 50 mm; and a tensile speed: 5 mm/min. This test was performed for 5 test pieces to calculate the average value, which was defined as the tensile elongation E of the film. The thickness of the film between the bench mark lines was measured (at 10 points in total) by using a dial thickness gage "H-1A" (trade name) from OZAKI MFG. CO., LTD. to calculate the average value, which was used as the film thickness.

Raw Materials Used

Component (A1)

(A1-1): chlorinated polyethylene "Elaslen 303A" (trade name) from Showa Denko K.K., chlorine content: 32% by mass, melt flow rate (at 180° C., 211.8 N): 120 g/10 min, heat of melting: 2 J/g (A1-2): chlorinated polyethylene "Elaslen 303B" (trade name) from Showa Denko K.K., chlorine content: 32% by mass, melt flow rate (at 180° C., 211.8 N): 25 g/10 min, heat of melting: 50 J/g (A1-3): chlorinated polyethylene "Elaslen 404B" (trade name) from Showa Denko K.K., chlorine content: 40% by mass, melt flow rate (at 180° C., 211.8 N): 25 g/10 min, heat of melting: 29 J/g Component (A2)

(A2-1): polyethylene "ENGAGE 8402" (trade name) from The Dow Chemical Company, melt flow rate (at 190° C., 21.18 N): 30 g/10 min, density: 877 kg/m$^3$, Tm-A2: 99° C.

(A2-2): polyethylene "ULTZEX 20200J" (trade name) from Prime Polymer Co., Ltd., melt flow rate (at 190° C., 21.18 N): 18.5 g/10 min, density: 918 kg/m$^3$, Tm-A2: 125° C.

Component (A3)

(A3-1): polyethylene "ULTZEX 20200J" (trade name Prime Polymer Co., Ltd., melt flow rate (at 190° C., 21.18 N): 18.5 g/10 min, density: 918 kg/m$^3$, Tm-A3: 125° C., Xc: 62%

(A3-2): polyethylene "NEO-ZEX 2024G" (trade name) from Prime Polymer Co., Ltd., melt flow rate (at 190° C., 21.18 N): 25 g/10 min, density: 915 kg/m$^3$, Tm-A3: 120° C., Xc: 75%

(A3-3): a 40/60 (mass ratio) mixture of polyethylene "Evolue SP4530" (trade name) from Prime Polymer Co., Ltd., melt flow rate (at 190° C., 21.18 N): 2.8 g/10 mm, density: 942 kg/m$^3$, Tm-A3: 132° C., Xc: 20%; and the following component (A3'-2), Tm-A3: 132° C., Xc: 68%

Comparative Component (A'3)

(A3'-1): polyethylene "D9100.00" (trade name) from The Dow Chemical Company, melt flow rate (at 190° C., 21.18 N): 1 g/10 min, density: 877 kg/m$^3$, Tm-A3: 118° C., Xc: 29%

(A3'-2): polyethylene "ENGAGE 8402" (trade name) from The Dow Chemical Company, melt flow rate (at 190° C., 21.18 N): 30 g/10 min, density: 877 kg/m$^3$, Tm-A3: 99° C., Xc: 100%

(A3'-3): polyethylene "Evolue SP4530" (trade name) from Prime Polymer Co., Ltd., melt flow rate (at 190° C., 21.18 N): 2.8 g/10 min, density: 942 kg/m$^3$, Tm-A3: 132° C., Xc: 20%

(A3'-4): a 50/50 (mass ratio) mixture of the above (A3'-1) and the above (A3'-2), Tm-A3: 118° C., Xc: 65%

Component (B)

(B-1): a multi-layered carbon nanotube "NANOCYL NC7000" (trade name) from NANOCYL SA, average diameter: 9.5 nm, average length: 1.5 μm, bulk specific density: 0.043 g/cm$^3$, purity: 90% by mass Component (C)

(C-1): acetylene black "DENKA BLACK": (trade name), particulate from DENKI KAGAKU KOGYO KABUSHIKI KAISHA, average particle diameter of primary particle: 35 nm (measured by using electron microscopy (TEM)), specific surface area: 69 m$^2$/g Comparative Component (C)

(C'-1): Ketjen black "KJ1300" (trade name) from Lion Corporation

Component (D): Optional Component (D-1): a stabilizer for a chlorinated polyethylene "STANN JF-95B" (trade name) from NITTO CHEMICAL INDUSTRY CO., LTD.

Formation of Film and Measurement/Evaluation of Physical Properties

Formulations

Formulations of respective Examples having a component rate shown in Tables 1 to 3 were melt-kneaded by using a 5-liter intensive mixer from Nippon Roll MFG. Co., Ltd. Then, the discharging temperature was set to 190° C. Subsequently, a film having a thickness of 300 μm was obtained by using an inverted L-shaped four-roll type rolling calender with a roll diameter of 200 mm and a roll thickness of 700 mm from Nippon Roll MPG. Co., Ltd. (roll temperatures: 205° C./205° C./185° C./175° C. in the order of first roll/second roll/third roll/forth roll, taking-off speed: 5 m/min). The above tests (i) to (vi) were performed for the obtained films. The results are shown in Tables 3 to 3.

TABLE 1

| | Example 1 | Example 2 | Example 3 | Example 4 | Example 5 | Example 6 | Example 7 | Example 8 |
|---|---|---|---|---|---|---|---|---|
| Formulation | | | | | | | | |
| (A1-1) | 60 | 60 | 60 | | 30 | 80 | 60 | |
| (A1-2) | | | | 60 | | | | |
| (A1-3) | | | | | | | | 60 |
| (A2-1) | 40 | 40 | | 40 | 70 | 20 | 40 | 40 |
| (A2-2) | | | 40 | | | | | |
| (B-1) | 35 | 45 | 35 | 35 | 35 | 35 | 25 | 35 |
| (C-1) | 40 | 20 | 40 | 40 | 40 | 40 | 60 | 40 |
| (C'-1) | | | | | | | | |
| (D-1) | 2 | 2 | 2 | 2 | 2 | 2 | 2 | 2 |
| Evaluation Result | | | | | | | | |
| (i) Initial conductivity (mΩ) | 77 | 73 | 97 | 7300 | 85 | 74 | 80 | 750 |
| (ii) Electrolytic solution resistance | ○ | ⊚ | ○ | Δ | Δ | Δ | Δ | ⊚ |
| (iii) Volume resistivity | 0.16 | 0.14 | 0.26 | 0.78 | 0.28 | 0.19 | 0.20 | 0.51 |
| (iv) Bending resistance | ○ | ○ | ○ | ○ | ○ | ○ | ○ | ○ |
| (v) Bending resistance after heat-moisture treatment | ○ | ○ | ○ | ○ | ○ | ○ | ○ | ○ |
| (vi) Tensile elongation (%) | 29 | 28 | 36 | 77 | 81 | 98 | 29 | 85 |

TABLE 2

|  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| Formulation |  |  |  |  |  |  |  |
| (A1-1) | 20 | 90 | 60 | 60 | 60 | 60 | 60 |
| (A1-2) |  |  |  |  |  |  |  |
| (A1-3) |  |  |  |  |  |  |  |
| (A2-1) | 80 | 10 | 40 | 40 | 40 | 40 | 40 |
| (A2-2) |  |  |  |  |  |  |  |
| (B-1) | 35 | 35 | 35 | 65 | 120 |  | 35 |
| (C-1) | 40 | 40 |  |  |  | 100 |  |
| (C'-1) |  |  |  |  |  |  | 40 |
| (D-1) | 2 | 2 | 2 | 2 | 2 | 2 | 2 |
| Evaluation Result |  |  |  |  |  |  |  |
| (i) Initial conductivity (mΩ) | 88 | 76 | 140 | 79 | 73 | 8300 | Failed in film-forming |
| (ii) Electrolytic solution resistance | Δ | X | Δ | Δ | Δ | X |  |
| (iii) Volume resistivity | 0.24 | 0.17 | 0.44 | 0.12 | 0.11 | 82400 |  |
| (iv) Bending resistance | ○ | ○ | ○ | Δ | X | X |  |
| (v) Bending resistance after heat-moisture treatment | Δ | ○ | ○ | Δ | X | X |  |
| (vi) Tensile elongation (%) | 61 | 120 | 23 | 21 | 11 | 3 |  |

TABLE 3

|  | Example 9 | Example 10 | Example 11 | Comparative Example 8 | Comparative Example 9 | Comparative Example 10 | Comparative Example 11 |
|---|---|---|---|---|---|---|---|
| Formulation |  |  |  |  |  |  |  |
| (A3-1) | 100 |  |  |  |  |  |  |
| (A3-2) |  | 100 |  |  |  |  |  |
| (A3-3) |  |  | 100 |  |  |  |  |
| (A3'-1) |  |  |  | 100 |  |  |  |
| (A3'-2) |  |  |  |  | 100 |  |  |
| (A3'-3) |  |  |  |  |  | 100 |  |
| (A3'-4) |  |  |  |  |  |  | 100 |
| (B-1) | 25 | 25 | 25 | 25 | 25 | 25 | 25 |
| (C-1) | 40 | 40 | 40 | 40 | 40 | 40 | 40 |
| Evaluation Result |  |  |  |  |  |  |  |
| (i) Initial conductivity (mΩ) | 260 | 250 | 270 | 250 | 260 | 250 | 250 |
| (ii) Electrolytic solution resistance | ○ | ○ | ○ | X | ○ | X | Δ |
| (iii) Volume resistivity | 0.78 | 0.97 | 0.91 | 0.42 | 0.61 | 0.44 | 0.64 |
| (iv) Bending resistance | ◎ | ◎ | ◎ | Δ | X | X | Δ |
| (v) Bending resistance after heat-moisture treatment | ◎ | ○ | ◎ | Δ | X | X | Δ |
| (vi) Tensile elongation (%) | 110 | 88 | 82 | 210 | 35 | 105 | 150 |

As can be seen from the results obtained in Examples, the films formed from the resin composition according to the present invention exhibited various properties including electrolytic solution resistance, volume resistivity, bending resistance, bending resistance after heat-moisture treatment and tensile elongation in a well-balanced manner at a high level. Further, in Examples other than Example 4 and Example 8, the initial conductivity was also excellent. In Example 4 and Example 8 ((A1-2) and (A1-3), both of which had a lower melt flow rate than that of (A1-1) and were crystalline, were used in Example 4 and Example 8, respectively), while a sufficiently good initial conductivity was not obtained, a low volume resistivity was obtained. Accordingly, the films obtained can be determined to be sufficient for practical use from the viewpoint of conductivity in addition to other properties.

On the other hand, in Comparative Example 1, the amount of the component (A2) was large and the bending resistance after heat-moisture treatment was insufficient. In Comparative Example 2, the amount of the component (A2) was small and the electrolytic solution resistance was poor. Comparative Examples 3 to 5 are those in which the component (C) was not used. In the case where the amount of the component (B) was small, the initial conductivity was inferior to those in Examples 1 and 7, and in the case where the amount of the component (B) was large, the bending resistance and the bending resistance after heat-moisture treatment were insufficient or poor. In Comparative Example 6, the component (B) was not used, and therefore the initial conductivity was poor and the volume resistivity was high. Further, the bending resistance and the bending resistance after heat-moisture treatment were also poor. In Comparative Example 7, in which Ketjen black was used in place of the component (C), a film could not be formed. Thus, the tests (i) to (vi) were omitted. In Comparative Example 8, the electrolytic solution resistance was poor and the bending resistance and the bending resistance after heat-moisture treatment were insufficient because Tm-A3 was low and Xc was also low. In Comparative Example 9, the bending resistance and the bending resistance after heat-moisture treatment were poor because Tm-A3 was low and Xc was high. In Comparative Examples 10 and 11, in which (A3'-3) and (A3'-4), either Tm-A3 or Xc of which was out of a given range, were used, respectively, the electrolytic solution resistance, the bending resistance and the bending resistance after heat-moisture treatment were poor as expected.

Embodiments of the invention provide a firm that is excellent in film formability, and a film formed from the resin composition has a high conductivity and excellent tensile elongation, bending resistance and flexibility. Therefore, the film formed from the resin composition can be suitably used for an electrode member in a storage battery, particularly an electrode in an electrolytic solution-circulating secondary battery such as a redox flow battery, a zinc-chlorine battery and a zinc-bromine battery, and a protective coating of the electrode.

According to at least one embodiment, FIG. 1 illustrates the following:
1: Highest melting point among peak top melting points in DSC second melting curve
2: Integration of melting enthalpy in temperature range of 110° C. or lower in DSC second melting curve
3: Boundary line at a temperature of 110° C. in DSC second inching curve According to at least one embodiment, FIG. 2 illustrates the following:
4: Electrode
5: Electrode Embodiments of the invention may suitably comprise, consist or consist essentially of the elements disclosed and may be practiced in the absence of an element not disclosed. For example, it can be recognized by those skilled in the art that certain steps can be combined into a single step.

Unless defined otherwise, all technical and scientific terms used have the same meaning as commonly understood by one of ordinary skill in the art to which this invention belongs.

The singular forms "a," "an," and "the" include plural referents, unless the context clearly dictates otherwise.

As used herein and in the appended claims, the words "comprise," "has," and "include" and all grammatical variations thereof are each intended to have an open, non-limiting meaning that does not exclude additional elements or steps.

"Optionally" means that the subsequently described event or circumstances may or may not occur. The description includes instances where the event or circumstance occurs and instances where it does not occur. As used herein, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that the mere use of the term "first" and "second" does not require that there be any "third" component, although that possibility is contemplated under the scope of the embodiments of the present invention.

Ranges may be expressed herein as from about one particular value, and/or to about another particular value. When such a range is expressed, it is to be understood that another embodiment is from the one particular value and/or to the other particular value, along with all combinations within said range.

All publications mentioned are incorporated by reference to disclose and describe the methods or materials, or both, in connection with which the publications are cited. The publications discussed are provided solely for their disclosure prior to the filing date of the present application. Nothing is to be construed as an admission that the invention is not entitled to antedate such publication by virtue of prior invention. Further, the dates of publication provided may be different from the actual publication dates, which may need to be independently confirmed.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The invention claimed is:
1. A resin composition, comprising:
   (A) 100 parts by mass of a thermoplastic resin;
   (B) 1 to 60 parts by mass of a carbon nanotube; and
   (C) 1 to 60 parts by mass of an acetylene black,
   wherein the thermoplastic resin (A) comprises:
      (A1) 30 to 80% by mass of a chlorinated polyethylene having a chlorine content of 2.0 to 45% by mass; and
      (A2) 70 to 20% by mass of a polyethylene other than (A1),
      wherein a sum of (A1) and (A2) is 100% by mass.
2. The resin composition according to claim 1, wherein a highest melting point among peak top melting points in a DSC melting curve of the component (A2) is 110° C. or lower.
3. The resin composition according to claim 1, wherein the component (A1) is amorphous.
4. An electrode member for a storage battery, wherein the electrode member comprises the resin composition according to claim 1.
5. A film comprising the resin composition according to claim 1.
6. An electrode member for a storage battery, wherein the electrode member comprises the film according to claim 5.
7. A resin composition, comprising:
   (A) 100 parts by mass of a thermoplastic resin;
   (B) 1 to 60 parts by mass of a carbon nanotube; and
   (C) 1 to 60 parts by mass of an acetylene black,
   wherein the thermoplastic resin (A) is (A3) a polyethylene satisfying the following properties (p) and (q):
   (p) a highest melting point among peak top melting points in a DSC melting curve is 120° C.' or higher; and
   (q) a fraction of melting enthalpy in a temperature range of 110° C. or lower relative to total melting enthalpy in a DSC melting curve is 50 to 80%.
8. An electrode member for a storage battery, wherein the electrode member comprises the resin composition according to claim 7.

9. A film comprising the resin composition according to claim 7.

\* \* \* \* \*